(12) United States Patent
Oh et al.

(10) Patent No.: US 7,424,995 B2
(45) Date of Patent: Sep. 16, 2008

(54) VALVE

(75) Inventors: Kwang-wook Oh, Gyeonggi-do (KR); Kak Namkoong, Seoul (KR)

(73) Assignee: Samsung Electronics Co., Ltd. (KR)

( * ) Notice: Subject to any disclaimer, the term of this patent is extended or adjusted under 35 U.S.C. 154(b) by 185 days.

(21) Appl. No.: 11/327,236

(22) Filed: Jan. 5, 2006

(65) Prior Publication Data

US 2006/0151732 A1 Jul. 13, 2006

(30) Foreign Application Priority Data

Jan. 7, 2005 (KR) ............. 10-2005-0001544

(51) Int. Cl.
*F16K 31/02* (2006.01)
(52) U.S. Cl. .................. 251/129.1; 137/872
(58) Field of Classification Search ............ 251/129.09, 251/129.1; 137/870, 872, 625.48, 625.5
See application file for complete search history.

(56) References Cited

U.S. PATENT DOCUMENTS

| | | | |
|---|---|---|---|
| 3,635,438 A | | 1/1972 | Peters .................. 251/137 |
| 3,809,123 A | * | 5/1974 | Heimann ............... 137/625.5 |
| 4,114,648 A | * | 9/1978 | Nakajima et al. ........ 137/625.5 |
| 4,349,042 A | | 9/1982 | Shimizu .................. 137/39 |
| 4,852,854 A | * | 8/1989 | Peng et al. ............. 251/129.17 |
| 5,393,132 A | * | 2/1995 | Yogo et al. ............... 303/116.1 |
| 6,158,713 A | | 12/2000 | Ohya et al. .............. 251/65 |
| 6,170,524 B1 | * | 1/2001 | Gray, Jr. ................ 137/625.18 |
| 6,578,604 B1 | * | 6/2003 | Adriansens ............. 137/614.2 |
| 6,786,467 B2 | * | 9/2004 | Gagnon ................. 251/129.15 |

FOREIGN PATENT DOCUMENTS

| | | |
|---|---|---|
| DE | 102 00 915 A 1 | 10/2002 |
| GB | 744858 | 2/1956 |
| WO | WO 2004/113714 A1 | 12/2004 |

OTHER PUBLICATIONS

European Search Report; Application No. 05 02 7356; Date: Apr. 4, 2006.
Micro Ball Valve for Fluidic Micropumps and Gases; Authors: O. Krusemark, A. Feustel, J. Muller; Supplied by The British Library—"The world's knowledge".

* cited by examiner

*Primary Examiner*—John K Fristoe, Jr.
(74) *Attorney, Agent, or Firm*—Cantor Colburn LLP

(57) ABSTRACT

A valve is provided. The valve includes a plunger, a chamber having a first region and a second region where the plunger moves back and forth, a first electromagnet and a second electromagnet which are located around the first region and the second region to apply a magnetic field to the plunger, a fluid inlet through which a fluid enters into the chamber, located between the first region and the second region of the chamber, and a second fluid outlet located on a vertical end part of the second region away from the first region.

13 Claims, 18 Drawing Sheets

VALVE

CROSS-REFERENCE TO RELATED PATENT APPLICATION

This application claims the benefit of Korean Patent Application No. 10-2005-0001544, filed on Jan. 7, 2005, in the Korean Intellectual Property Office, the disclosure of which is incorporated herein in its entirety by reference.

BACKGROUND OF THE INVENTION

1. Field of the Invention

The present invention relates to a valve, and more particularly, to a bi-stable ball valve that uses an electromagnet actuation.

2. Description of the Related Art

Valves are connected to a tube to control the flow rate or pressure of a fluid. One type of valve is the ball valve, which is an essential element of a microfluidic system, such as a fluid transportation system for a fluid control system through a fluid channel, a fluid switch for a reagent sample, and sample intake, calibration, and rinsing of a reagent.

FIG. 1 is a cross-sectional view illustrating a conventional ball valve that uses an electromagnet (refer to O. Krusemark, A. Feustel, and J. Muller, μ (micro) TAS'98, pp. 399-402, 1998).

Referring to FIG. 1, the conventional ball valve comprises a channel part 110, a ball 120, a cover unit 130 above the channel unit 110, and an electromagnet 140 above the cover unit 130. The channel unit 110 includes a fluid outlet 112 and a taper type valve seat 114. The cover unit 130 includes a fluid inlet connected to a long radius area of the valve seat 114. The electromagnet 140 applies a magnetic force to the ball 120.

When a current is applied to the electromagnet 140 from an external power source (not shown), the electromagnet produces a magnetic field. When the ball 120 is lifted toward the cover unit 130 by the magnetic field, the valve is kept open.

However, in the conventional valve having the above structure, energy is continuously consumed when the valve is open, since the ball drops when the current supply is disconnected.

Also, the above valve is kept closed by the fluid pressure, but when the fluid pressure is not sufficient, the valve may leak.

SUMMARY OF THE INVENTION

The present invention provides a valve that can reduce energy consumption using a bi-stable state.

The present invention also provides a valve that can reduce leakage even if fluid pressure is low.

According to an aspect of the present invention, there is provided a valve comprising: a plunger; a chamber having a first region and a second region where the plunger moves back and forth; a first electromagnet and a second electromagnet which are located around the first region and the second region and apply an operation magnetic field to the plunger; a fluid inlet through which a fluid enters into the chamber, located between the first region and the second region of the chamber; and a second fluid outlet located on a vertical end part of the second region away from the first region.

The valve may further comprise a second valve seat, which the plunger contacts, on the second fluid outlet, and which can be formed of a polymer. The valve may further comprise a second magnet unit that applies a force attracting the plunger to the second valve seat, around the second valve seat. The valve may further comprise a pressure balancing channel that aids the movement of the plunger by connecting a side surface of the fluid inlet to a vertical end part of the first region.

According to another aspect of the present invention, the valve can further comprise a first fluid outlet on a vertical end part of the first region away from the second region, to selectively control the flow of the fluid. The valve may further comprise a first valve seat, which the plunger contacts, on the first fluid outlet, and which can be formed of a polymer. The valve may further comprise a first magnet unit that applies a force attracting the plunger to the first valve seat, around the first valve seat.

The plunger can be formed of a ferromagnetic material, and an elastic coating film may be further included on the plunger to seal the valve.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
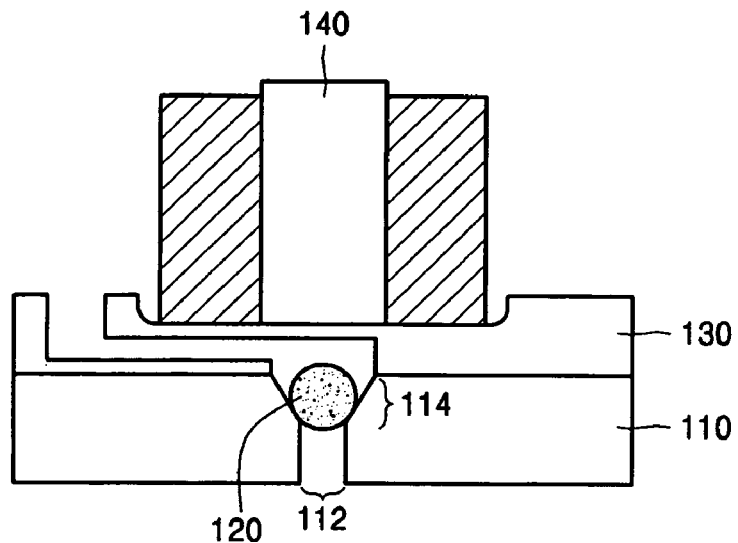
FIG. 1 is a cross-sectional view illustrating a conventional ball valve that uses an electromagnet.

The present invention will now be described more fully with reference to the accompanying drawings in which exemplary embodiments of the invention are shown. In the drawings, the widths and heights of layers that constitute a valve are exaggerated for clarity.

Figure 2:
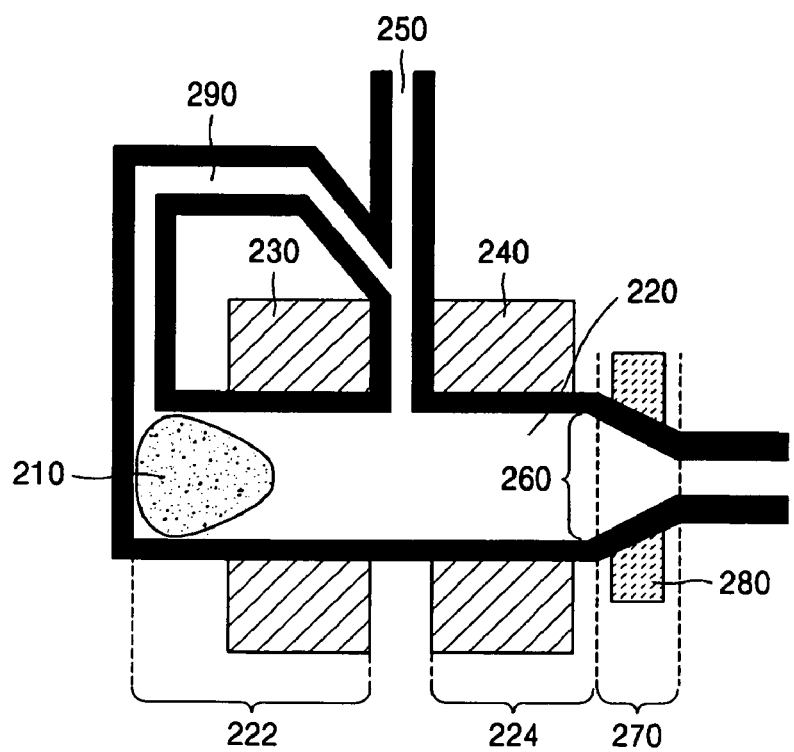
FIG. 2 is a cross-sectional view illustrating a valve according to a first embodiment of the present invention.

FIG. 2 is a cross-sectional view illustrating a valve according to a first embodiment of the present invention.

Referring to FIG. 2, a valve according to the first embodiment comprises a plunger 210 and a chamber 220 that has a first region 222 and a second region 224. A first electromagnet 230 and a second electromagnet 240 are respectively located on the periphery of the first and second regions 222 and 224. Also, a fluid inlet 250 through which a fluid enters into the chamber 220, and a second fluid outlet 260, are formed on a vertical end part of the second region 224 away from the first region 222.

The valve can further comprise a pressure balancing channel 290 that connects one side of the fluid inlet 250 to an end part of the first region 222 away from the second region 224, so that the plunger 210 can readily be moved to the first region 222 when the valve opens. Also, the chamber 220 can be any shape, such as a channel or a tube shape, as long as a fluid can pass through.

The first electromagnet 230 and the second electromagnet 240 form magnetic fields when a current is applied from an external power source (not shown). The magnetic field is an attraction force that can move the plunger 210. At this time, the first and second electromagnets 230 and 240 each can be composed of one solenoid or two solenoids. The first and second electromagnets 230 and 240 are elements designed to impress controlled magnetic force to the plunger without contact, such as a micro electromagnet composed of a micro coil structure or a permanent magnet tip driven by a linear motor.

The plunger 210 is formed of a ferromagnetic material which is attracted by a magnetic force generated by the first and second electromagnets 230 and 240. Also, the plunger 210 can move in the chamber 220 and can be formed in any shape as long as it corresponds to a second valve seat 270 for sealing the valve in a closed state. Preferably, an elastic coating film that seals the valve is further formed on the plunger 210.

In the first embodiment, the second valve seat 270 is further included around the second fluid outlet 260 to contact the plunger 210. The second valve seat 270 is preferably formed of a polymer so that it can form a dynamically stable valve seat having a tight sealing property. More preferably, a second magnet unit 280 or 330 (see FIG. 16) that applies an attraction force to the plunger 210 or 310 is located around a first valve seat 320 or the second valve seat 270, to reduce leakage that can occur if the plunger 210 does not seal the valve tightly due to insufficient fluid pressure. The second magnet unit 280 or 330 can be a permanent magnet or an electromagnet.

Figure 3:
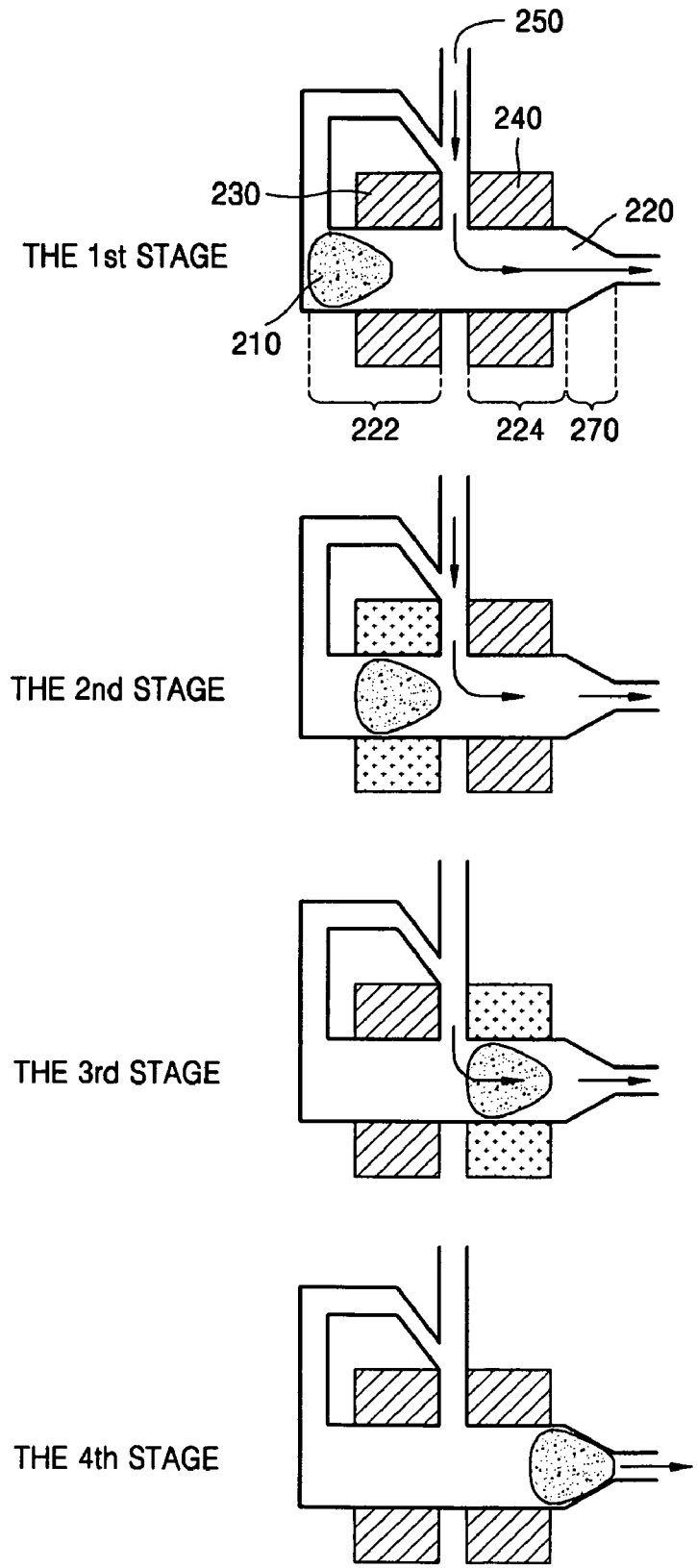
FIGS. 3 through 5 are cross-sectional views illustrating a method of operating a valve from an open stable state to a closed stable state in a method of operating the valve according to the first embodiment of the present invention.

FIG. 3 is a cross-sectional view illustrating an operating sequence of a valve from an open stable state to a closed stable state in a method of operating the valve according to the first embodiment of the present invention.

The operation of the valve according to the first embodiment includes: a first stage—the plunger 210 is positioned in the first region 222 and no current is applied to the first and second electromagnets 230 and 240; a second stage—a current is applied to the first electromagnet 230 but not the second electromagnet 240; a third stage—a current is applied to the second electromagnet 240 but not the first electromagnet 230; a fourth stage—no current is applied to the first and second electromagnets 230 and 240.

In the first stage, the valve is open, since the plunger 210 is positioned in the first region 222 and a fluid enters through the fluid inlet 250 and passes the second fluid outlet 260 through the second region 224 of the chamber 220. In the second stage, the plunger 210 in the chamber 220 is moved to the first region 222 close to the first electromagnet 230 by the magnetic field formed by the first electromagnet 230. In the third stage, the plunger 210 is moved to the second region 224 close to the second electromagnet 240 by the magnetic field formed by the second electromagnet 240. In the fourth stage, the plunger 210 is moved to the second valve seat 270 by the pressure and inertia of the fluid flowing in the chamber 220. The plunger 210 keeps contact with the second valve seat 270 due to the fluid pressure. Then, the valve is closed since it is sealed by the contact between the plunger 210 and the second valve seat 270.

Figure 4:
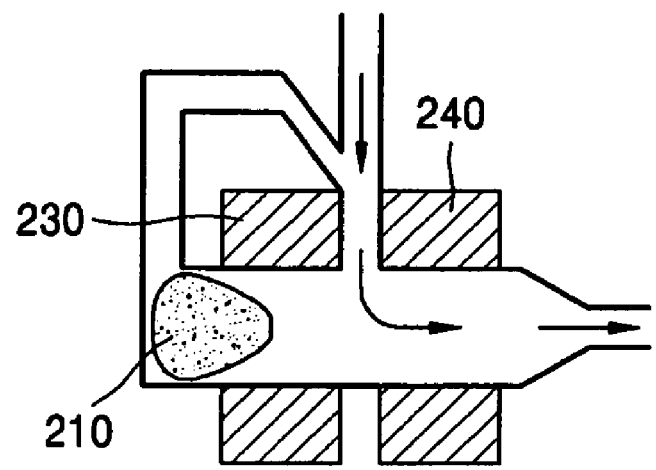
Figure 4:
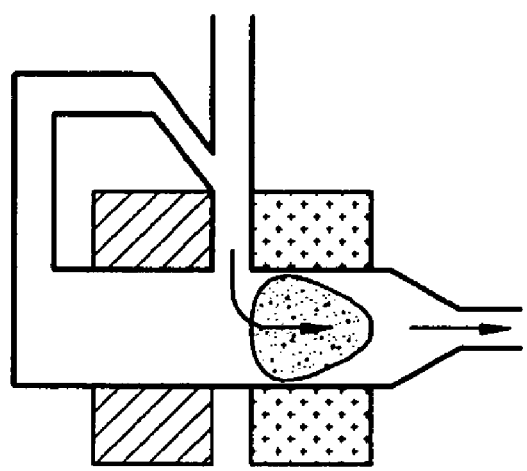
Figure 4:
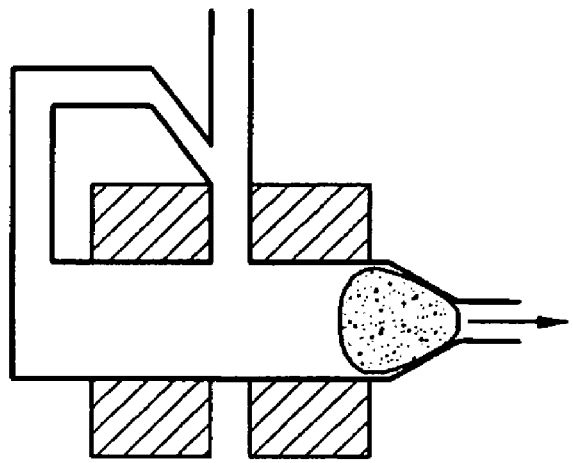
Figure 5:
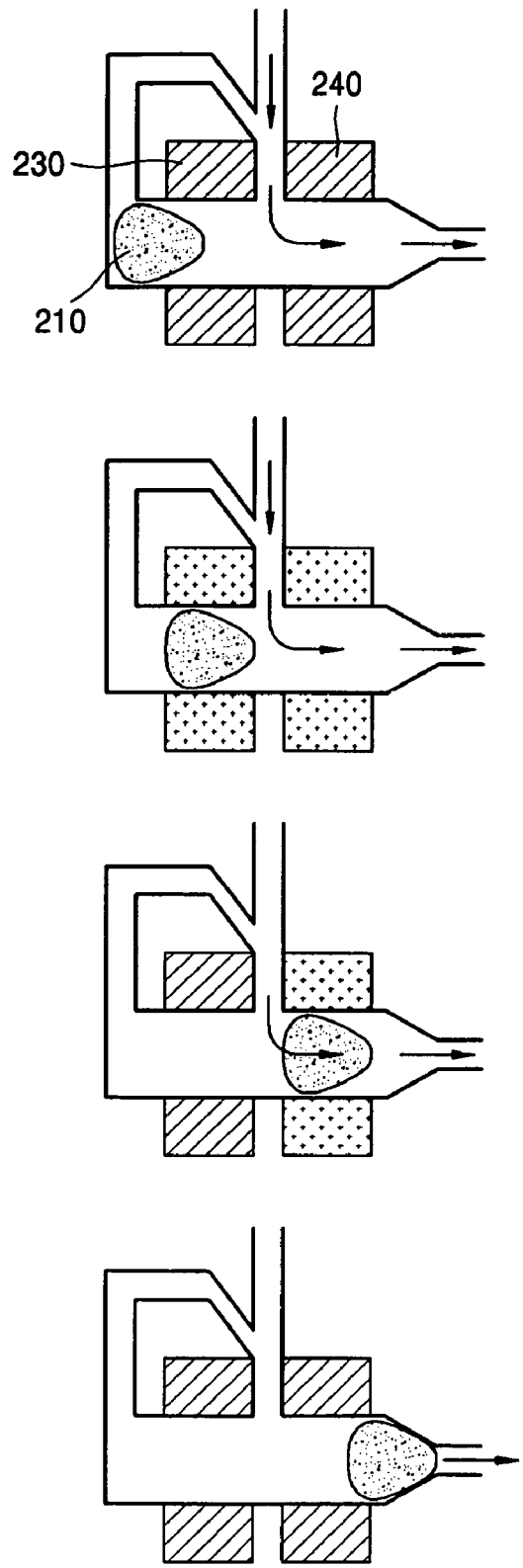

FIGS. 4 and 5 are cross-sectional views illustrating another operation sequence of a valve from an open stable state to a closed stable state according to the first embodiment of the present invention. Referring to FIG. 4, the second stage may be omitted if the plunger 210 can be moved by the second electromagnet 240. Referring to FIG. 5, the second stage can include an operation for applying a current to the second electromagnet 240 together with the first electromagnet 230 to move the plunger 210.

Figure 6:
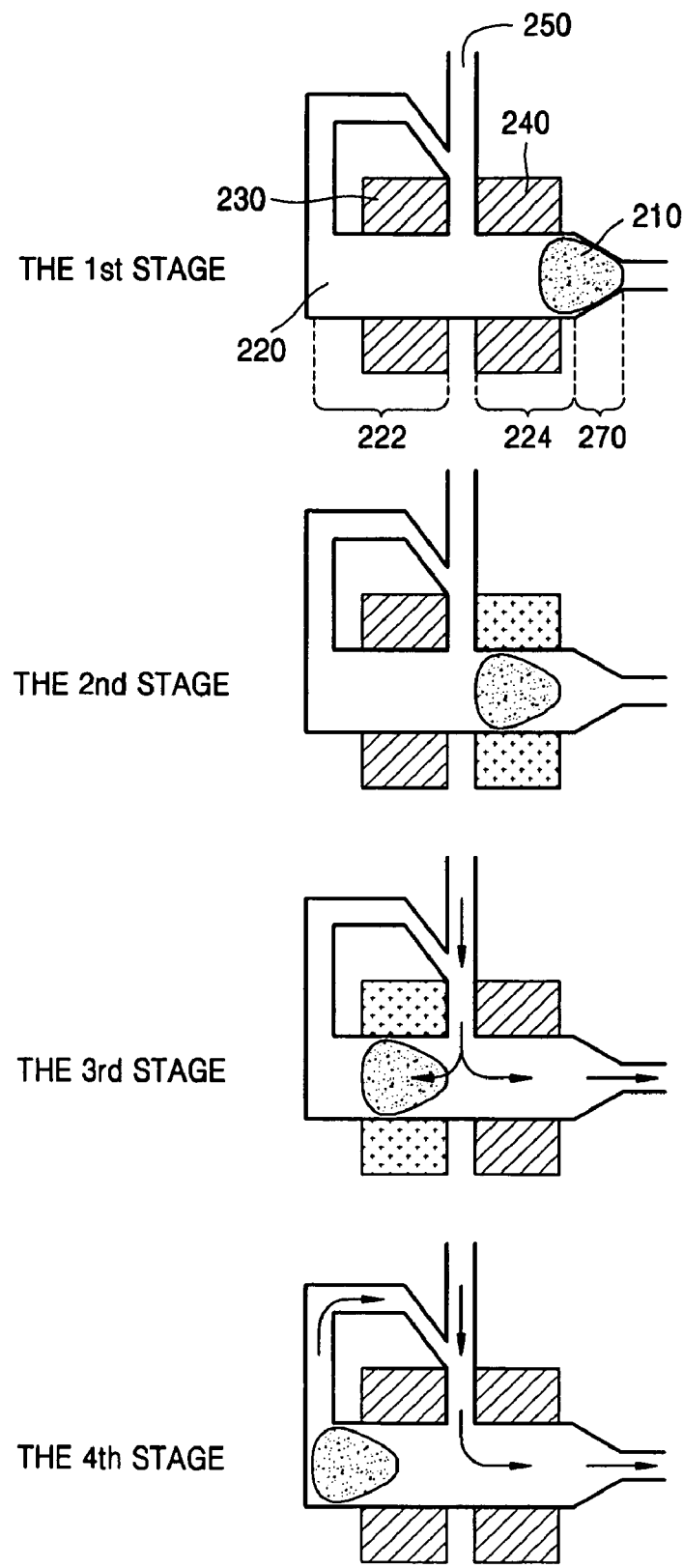
FIGS. 6 through 8 are cross-sectional views illustrating a method of operating a valve from a closed stable state to an open stable state in a method of operating the valve according to the first embodiment of the present invention.

FIG. 6 is a cross-sectional view illustrating a method of operating a valve from a closed stable state to an open stable state in a method of operating a valve according to the first embodiment of the present invention. Referring to FIG. 6, the operation of the valve according to the first embodiment includes: a first stage—the plunger 210 is positioned in the second region 224 and no current is applied to the first and second electromagnets 230 and 240; a second stage—a current is applied to the second electromagnet 240 but not the first electromagnet 230; a third stage—a current is applied to the first electromagnet 230 but not the second electromagnet 240; a fourth stage—no current is applied to the first and second electromagnets 230 and 240.

In the first stage, the valve is closed since the fluid pressure maintains the contact between the plunger 210 and the second valve seat 270. In the second stage, the plunger 210 in the chamber 220 is moved to the second region 224 close to the second electromagnet 240 by the magnetic field formed by the second electromagnet 240. In the third stage, the plunger 210 is moved to the first region 222 close to the first electromagnet 230 by the magnetic field formed by the first electromagnet 230. In the fourth stage, the plunger 210 is positioned in the first region 222 and the valve stays open since the fluid enters through the fluid inlet 250 and passes the second fluid outlet 260 through the second region 224 of the chamber 220.

Figure 7:
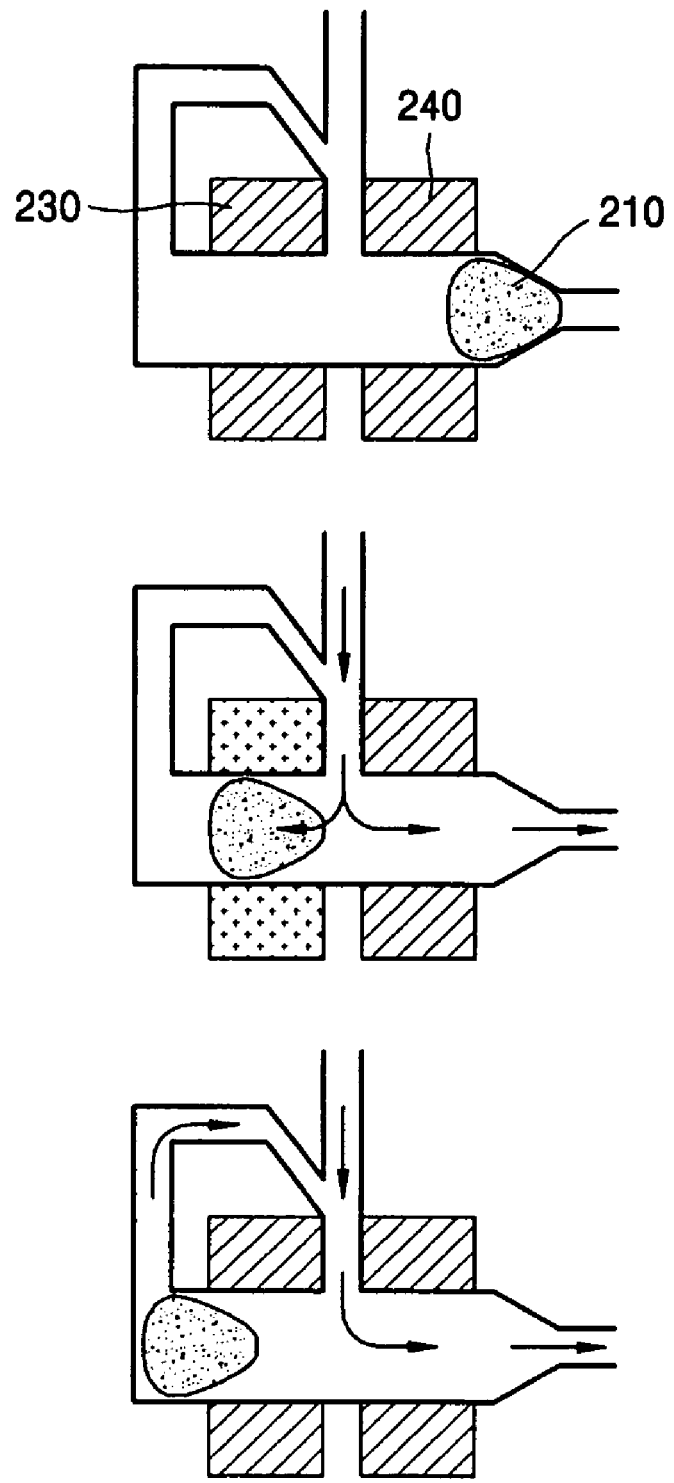
Figure 8:
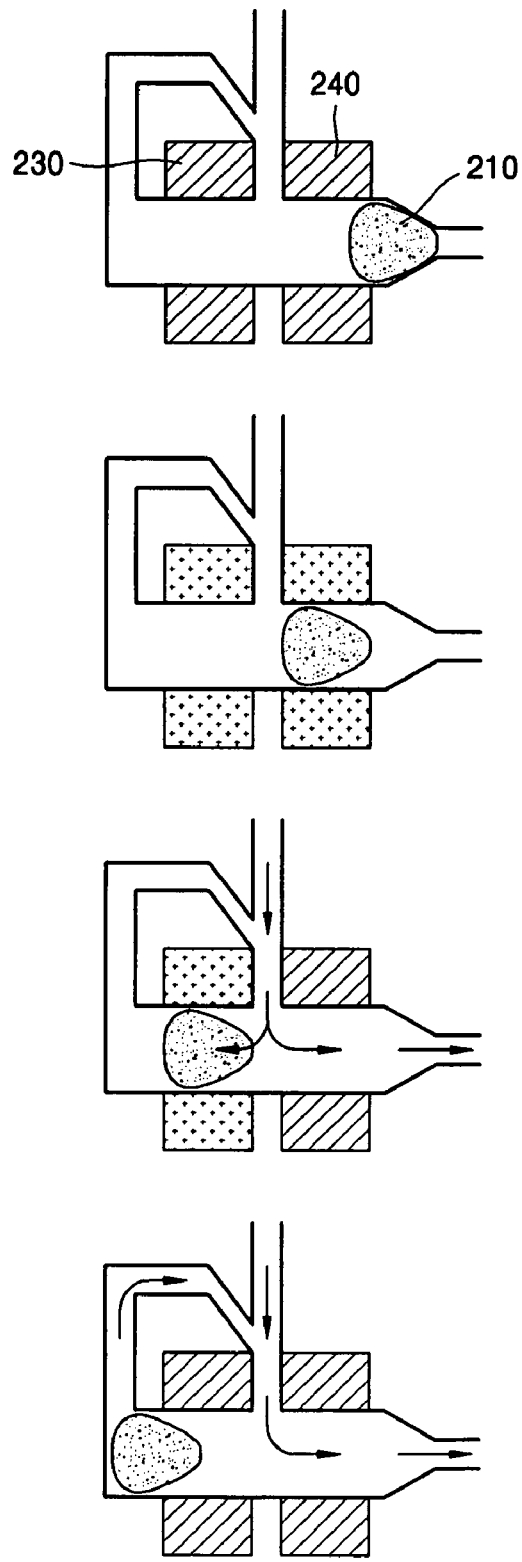

FIGS. 7 and 8 are cross-sectional views illustrating another operation sequence of a valve from a closed stable state to an open stable state according to the first embodiment of the present invention. Referring to FIG. 7, the second stage may be omitted if the plunger 210 can be moved by the first electromagnet 230. Referring to FIG. 8, the second stage can include an operation for applying a current to the second electromagnet 240 together with the first electromagnet 230 to move the plunger 210.

A computational simulation by CFD-ACE tool is performed to test a valve having the above structure according to the first embodiment of the present invention.

Figure 9:
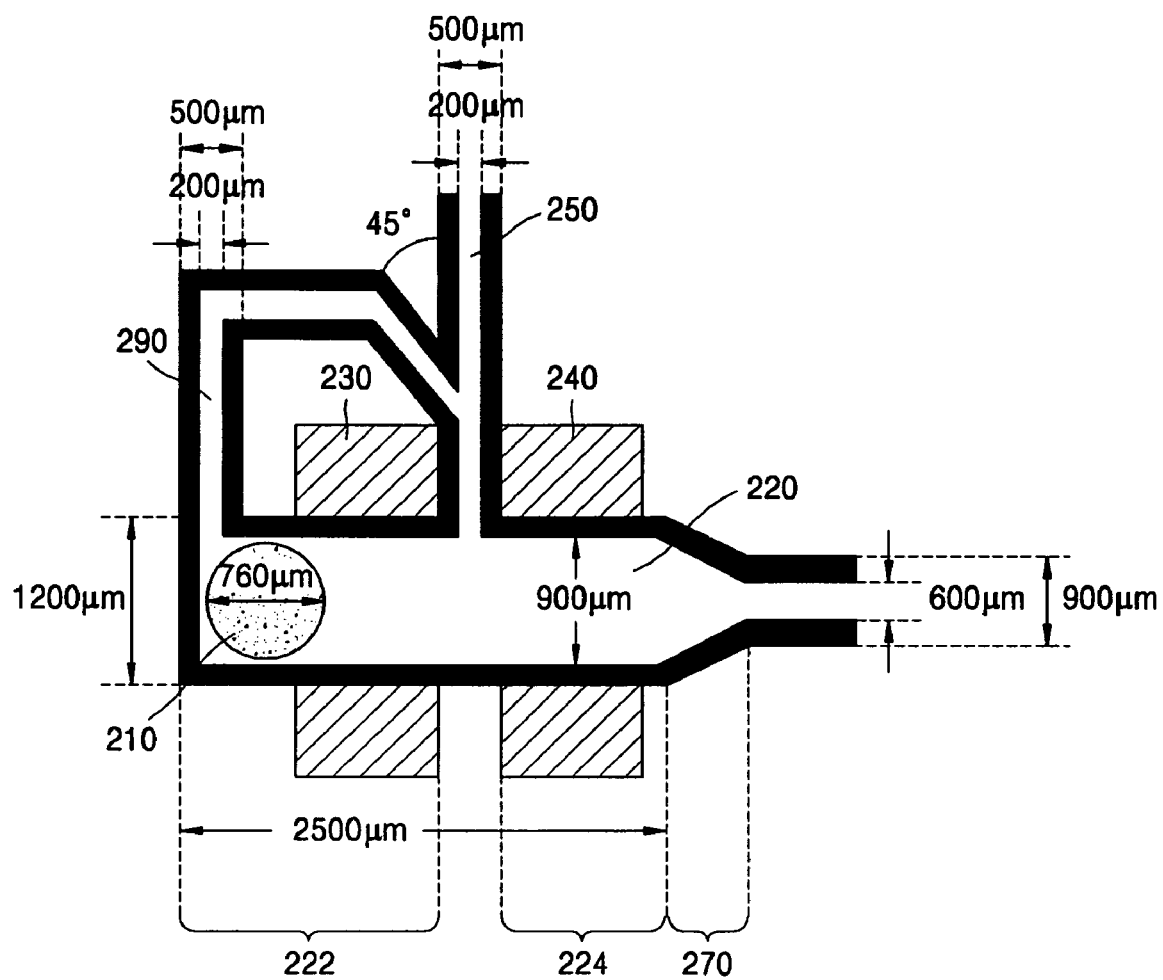
FIG. 9 is a cross-sectional view illustrating a valve used for performing a simulation (CFD-ACE) according to the first embodiment of the present invention.

FIG. 9 is a cross-sectional view illustrating a valve used for performing a CFD-ACE according to the first embodiment of the present invention.

Referring to FIG. 9, the diameter of a ball plunger 210 is 760 μm. The inner diameter of the cylindrical Teflon chamber 220 having a first region 222 and a second region 224 is 900 μm, the outer diameter of the chamber 220 is 1200 μm, and the length of the chamber 220 is 2500 μm. The first electromagnet 230 and the second electromagnet 240 are respectively located on the periphery of the first region 222 and the second region 224. The inner diameter of a fluid inlet 250 located on a side surface of the chamber 220 between the first region 222 and the second region 224 is 200 μm, and the outer diameter of the fluid inlet 250 is 500 μm. A tapered second valve seat 270 is connected to a second fluid outlet 260 located on a vertical end part of the second region 224 away from the first region 222. A silicon tube having an inner diameter of 600 μm and an outer diameter of 900 μm is connected to the second valve seat 270. The inner diameter of a pressure balancing channel 290 that connects a side surface of the fluid inlet 250 and a vertical end part of the first region 222 away from the second region 224 is 500 μm. Also, the pressure balancing channel 290 is connected to the fluid inlet 250 at an angle of 45° with a direction of the inflow. The fluid that flows in the valve is water and the valve is surrounded by air.

Figure 10:
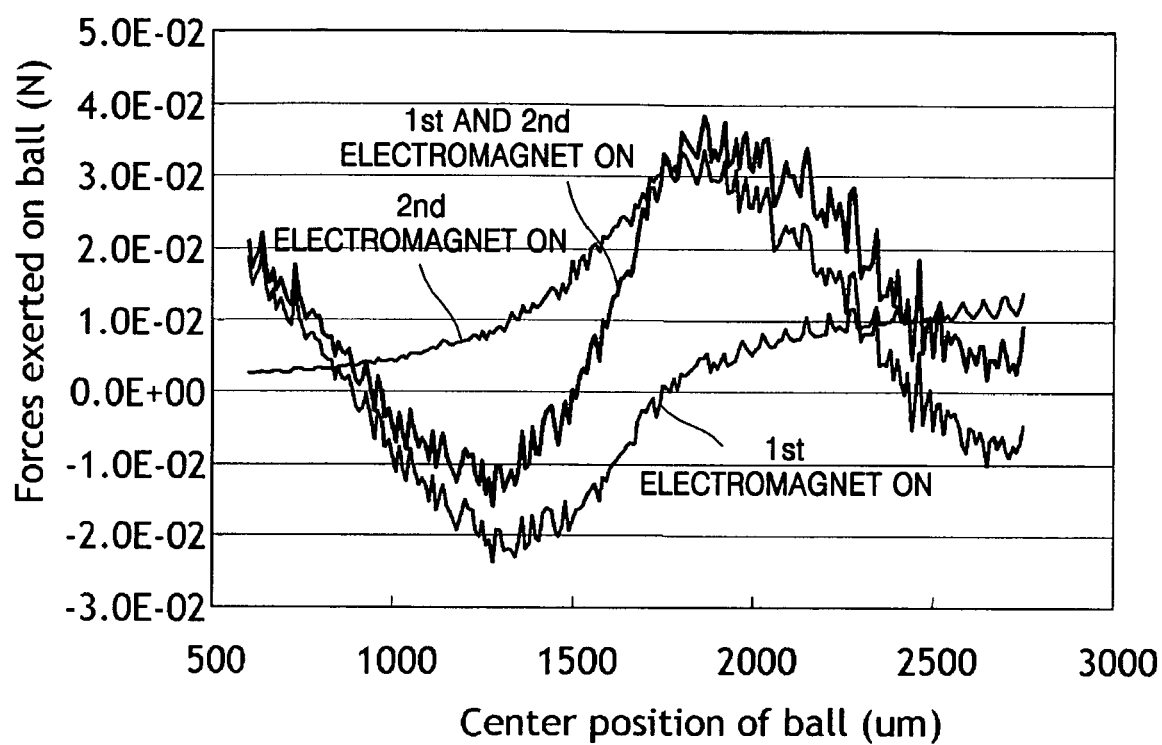
FIG. 10 is a graph showing the magnitude of forces applied to a plunger from a vertical end part of a first region according to current applied to each electromagnet in a valve according to the first embodiment of the present invention.

FIG. 10 is a graph showing the magnitudes of forces exerted on a plunger 210 from a vertical end part of a first region 222 according to the magnitude of current applied to each electromagnet in a valve according to the first embodiment of the present invention.

Figure 11:
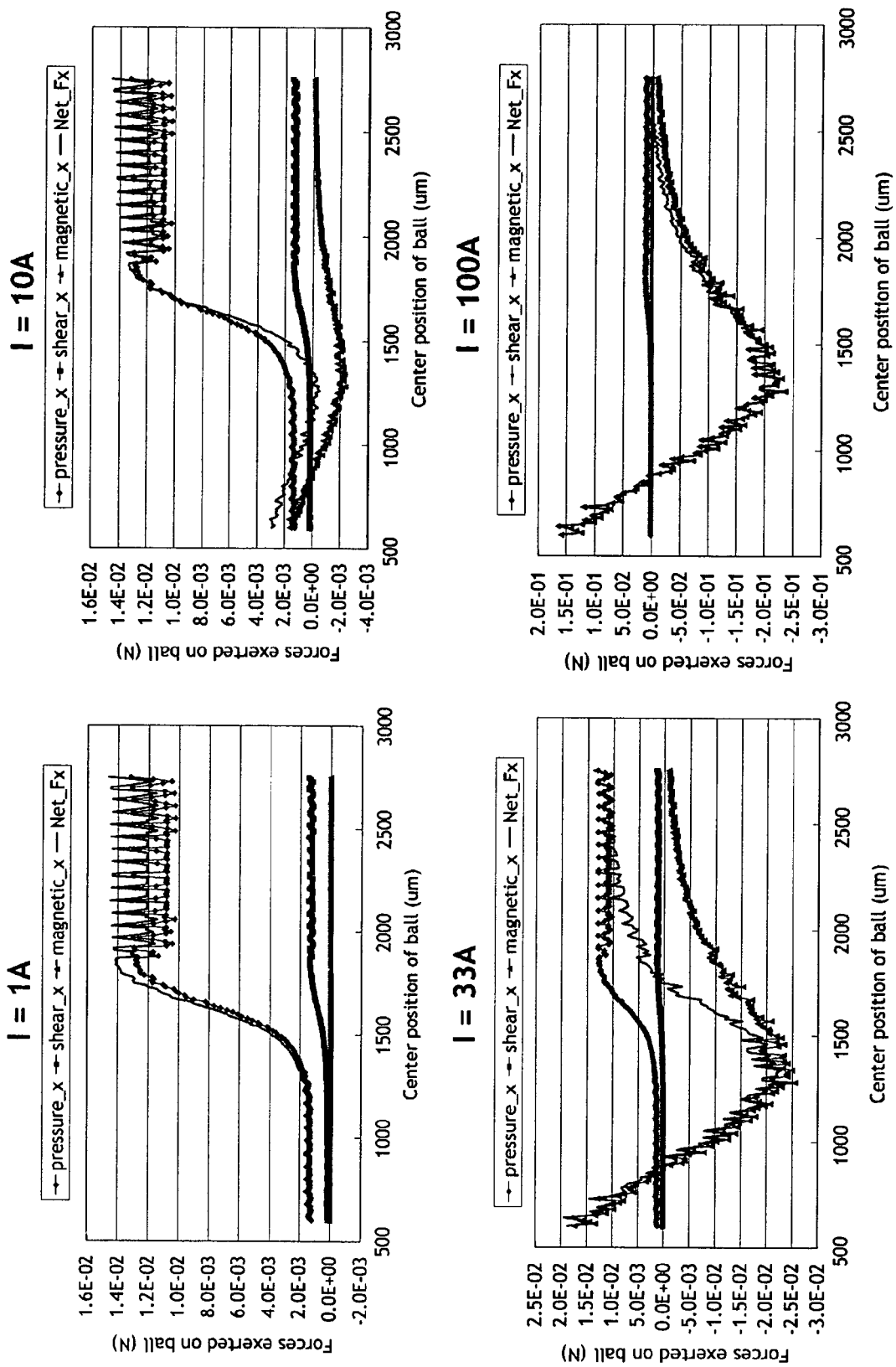
FIGS. 11 through 13 are graphs showing the magnitude of forces applied to a plunger from a vertical end part of a first region according to the magnitude of current applied to each electromagnet when the speed of a fluid is 0.026 m/s in a valve according to the first embodiment of the present invention.
Figure 12:
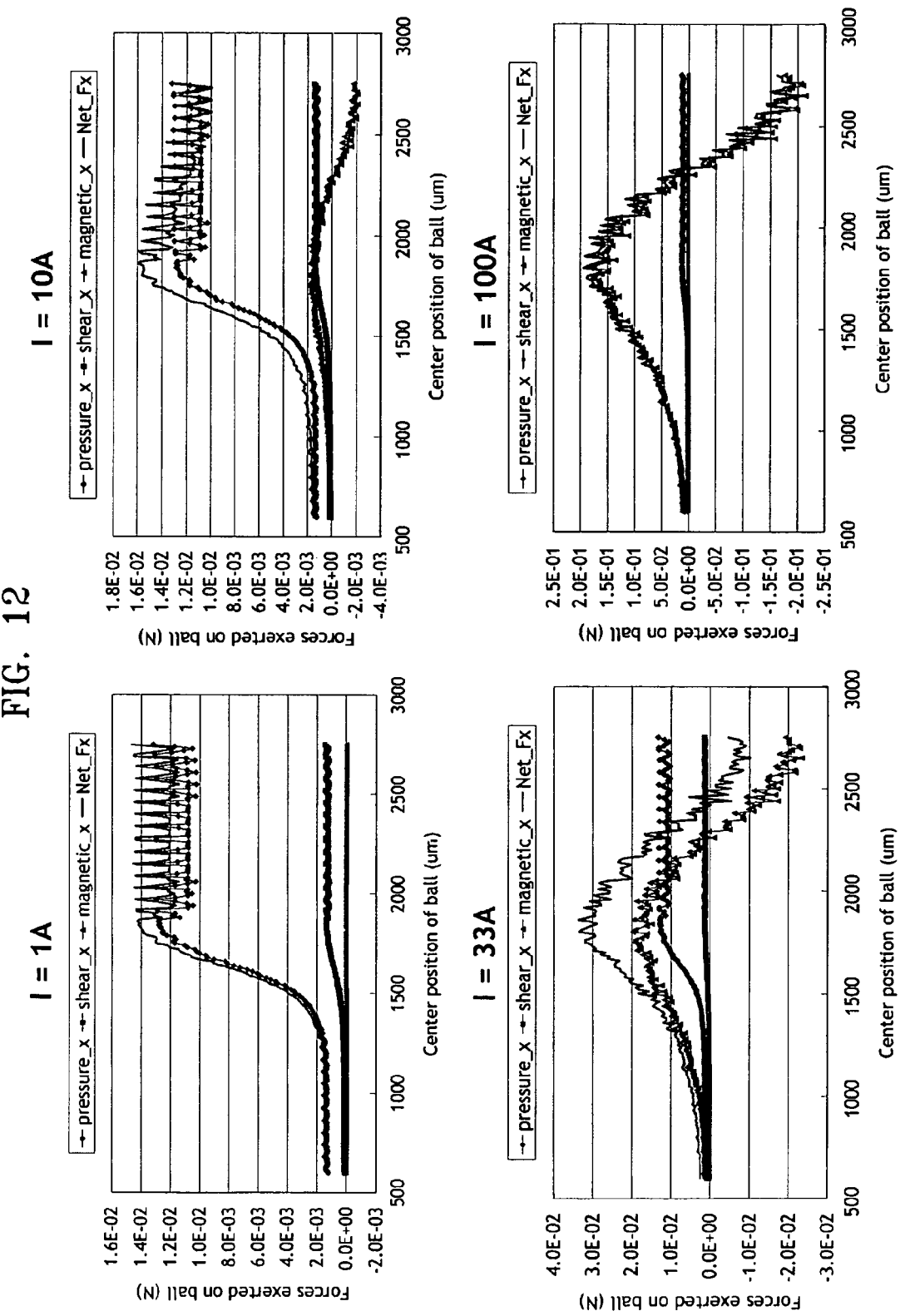
Figure 13:
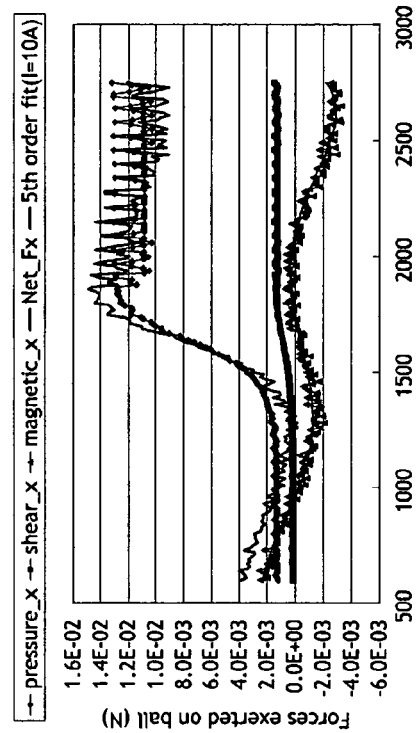
Figure 13:
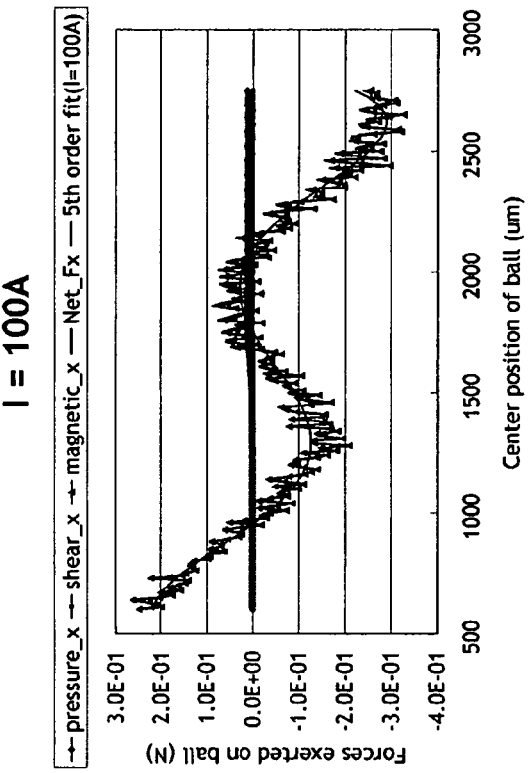
Figure 13:
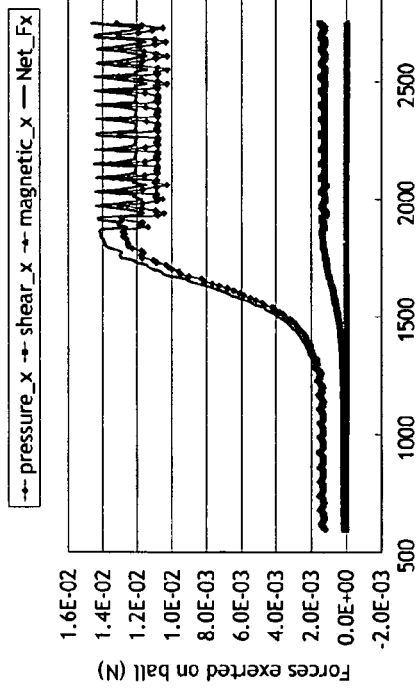
Figure 13:
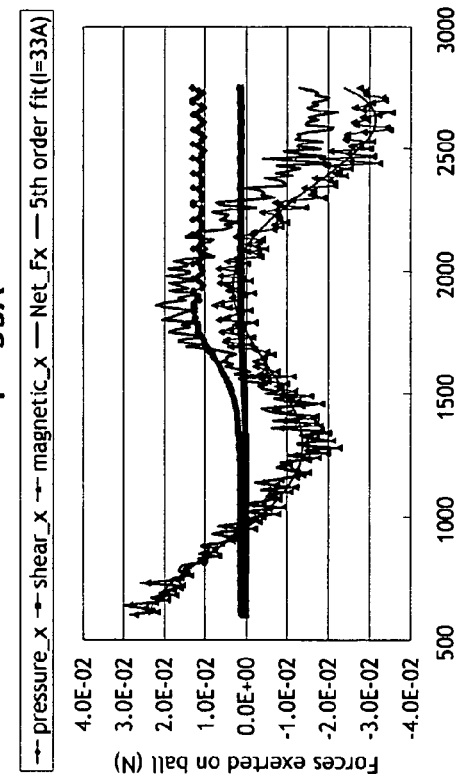

FIG. 11 through 13 are graphs showing the magnitudes of forces exerted on a plunger 210 from a vertical end part of a first region 222 according to the magnitude of current applied to each electromagnet when the speed of a fluid is 0.026 m/s in a valve according to the first embodiment of the present invention. The graphs in FIG. 11 are the results when currents I are applied to the first electromagnet, the graphs in FIG. 12 are the results when currents I are applied to the second electromagnet, and the graphs in FIG. 13 are the results when currents I are applied to both the first electromagnet and the second electromagnet.

FIGS. 11 through 13 show that as the magnitude of the current applied to each of the electromagnets increases, the magnitude of the forces exerted on the ball plunger 210 increases. Also, from each of the graphs when the applied current is 33A, it can be seen that when at least a certain current is applied, the main force on the plunger 210 is magnetic force.

Figure 14:
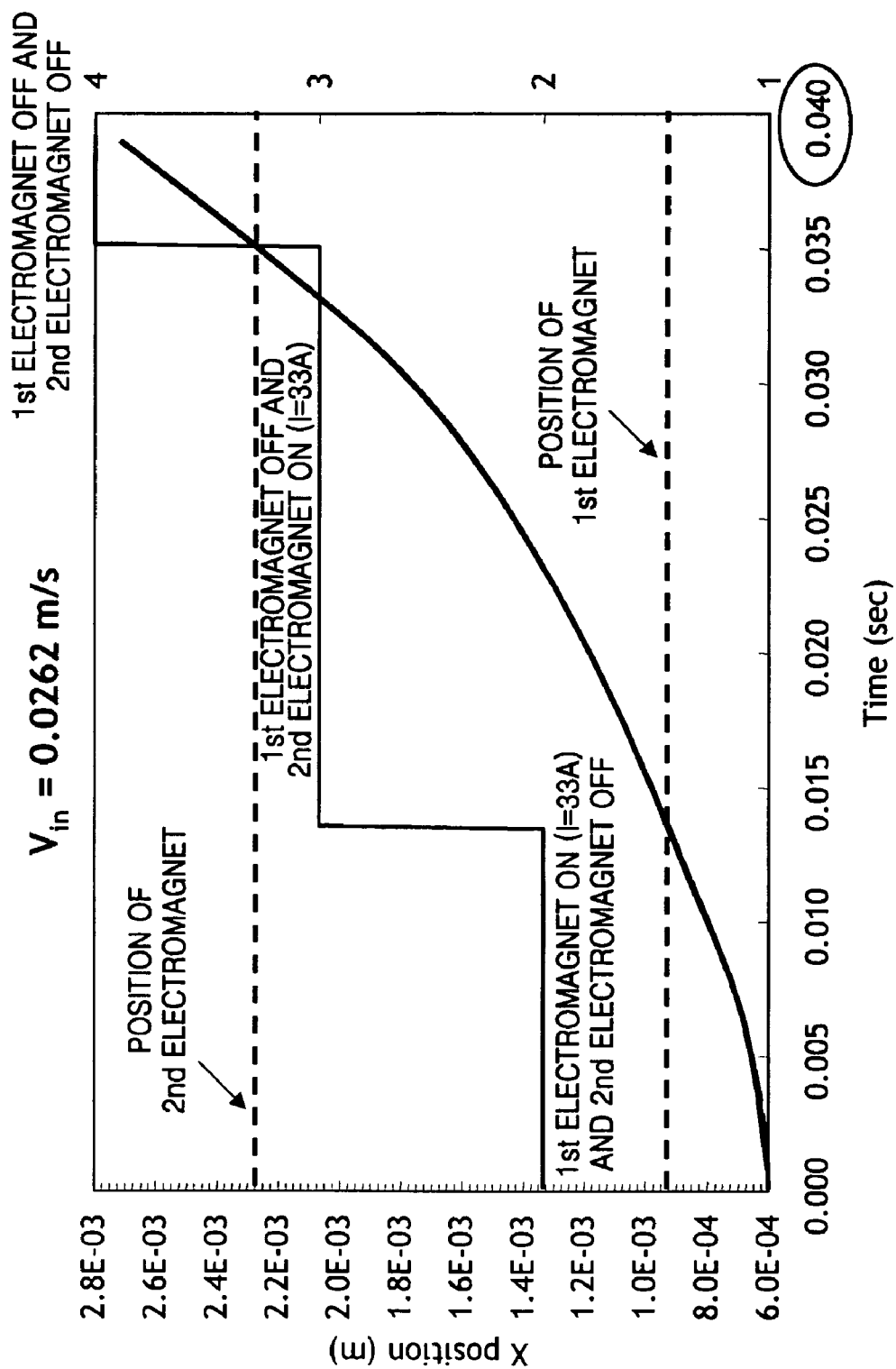
FIGS. 14 and 15 are graphs showing the locations of a plunger over time in a method of operating a valve according to the first embodiment of the present invention.
Figure 15:
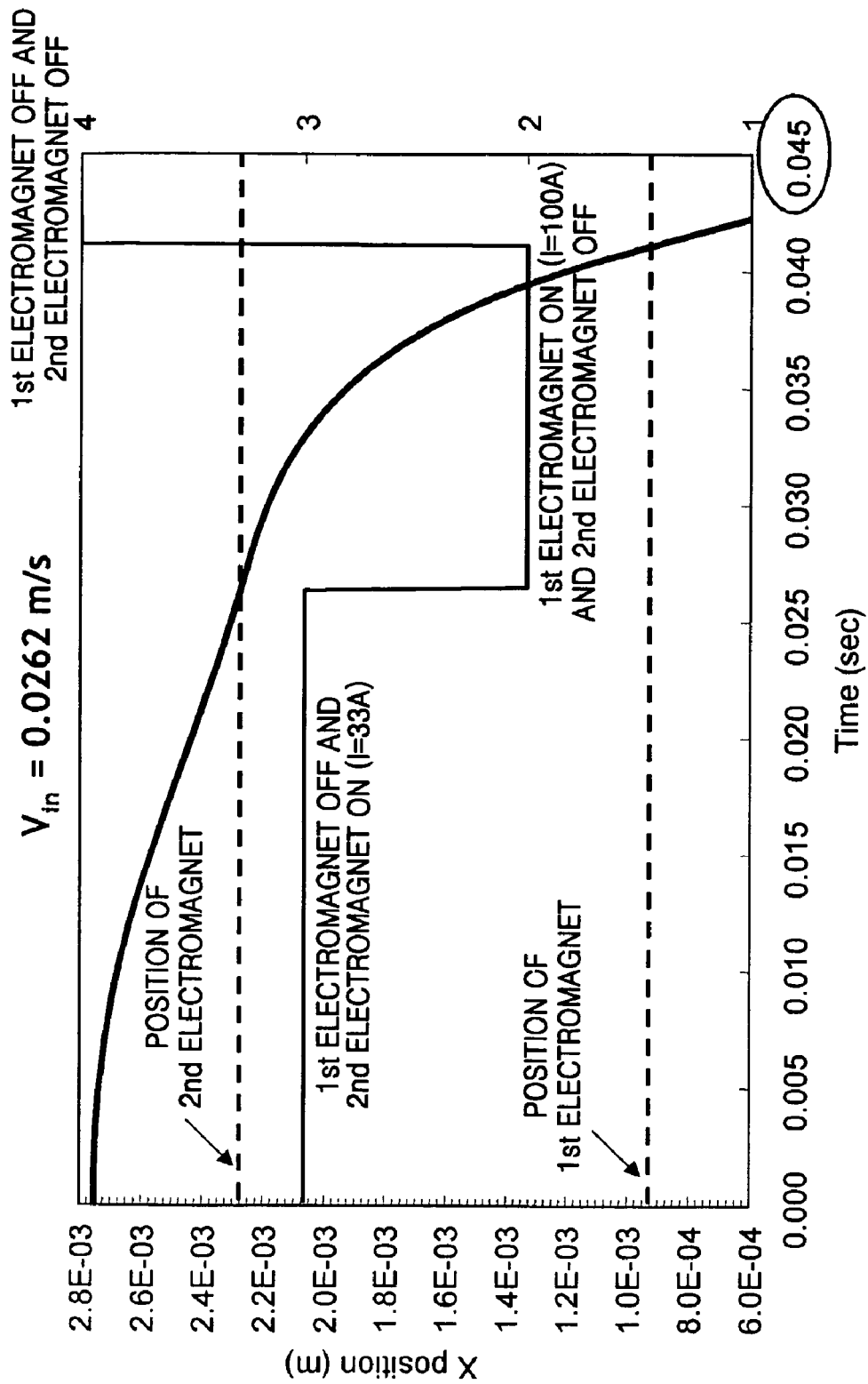

FIGS. 14 and 15 are graphs showing the locations of a plunger 210 over time in a method of operating a valve according to the first embodiment of the present invention.

Referring to FIG. 14, in the valve according to the first embodiment, the valve closes after 0.04 seconds by moving the plunger 210 in the valve when a current is applied to each electromagnet according to the method of operating the valve from an open stable state to a closed stable state. Referring to FIG. 15, the valve opens after 0.045 second by moving the plunger 210 in the valve when a current is applied to each electromagnet according to the method of operating the valve from a closed stable state to an open stable state.

Figure 16:
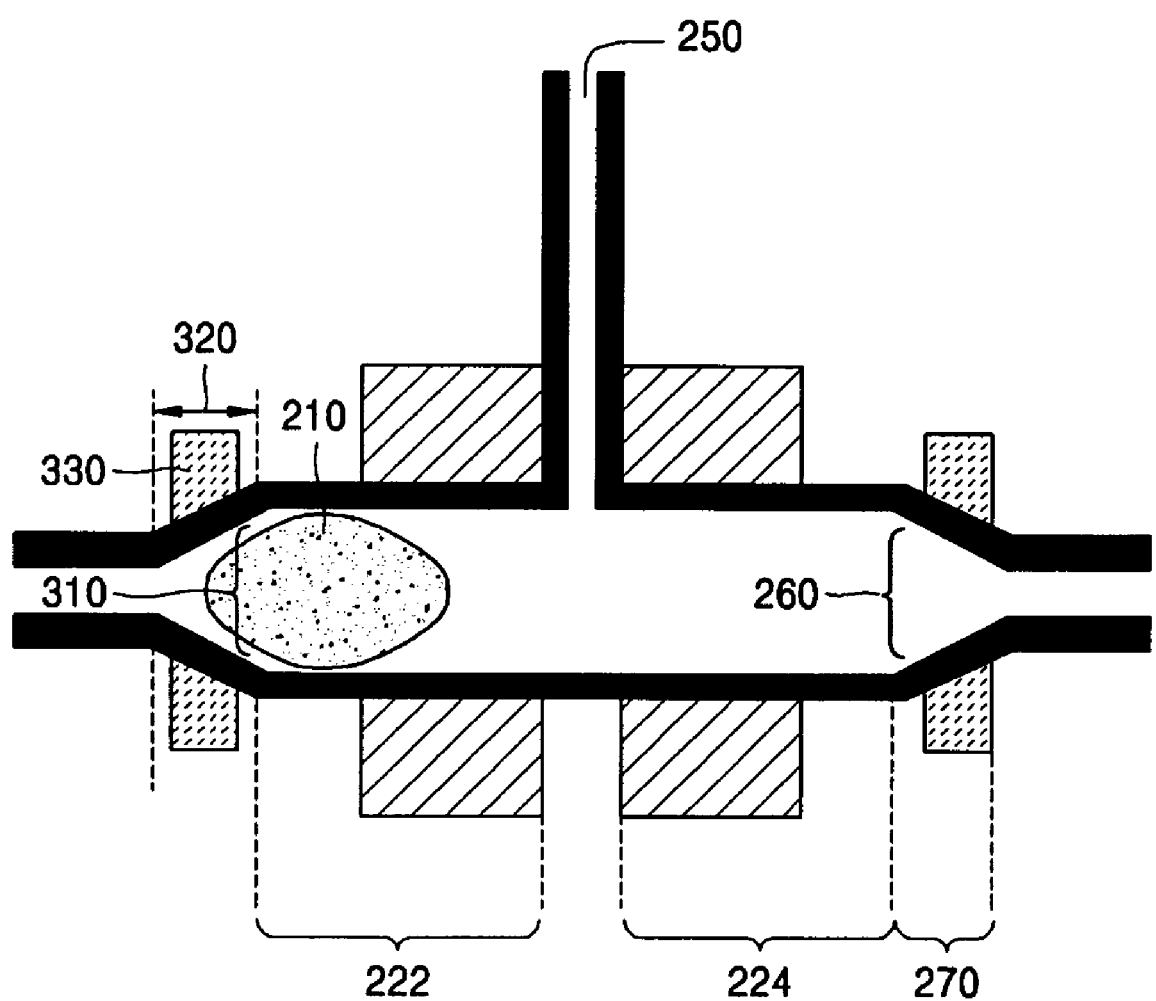
FIG. 16 is a cross-sectional view illustrating a valve according to a second embodiment of the present invention.

FIG. 16 is a cross-sectional view illustrating a valve according to a second embodiment of the present invention. Here, reference numerals common to FIG. 2 denote the same elements, and their descriptions will not be repeated.

Referring to FIG. 16, a valve according to the second embodiment of the present invention includes a first fluid outlet 310 located on an end part of a first region 222 away from a second region 224 to selectively control the flow of fluid. Preferably, a first valve seat 320, which the plunger 210 contacts, can further be included in the valve and can be formed of a polymer. Also, a first magnetic unit 330 that applies an attraction force to hold the plunger 210 into the first valve seat 320 can further be included around the first valve seat 320.

The valve according to the second embodiment is a control valve in which a fluid entering through the fluid inlet 250 can selectively move to the first fluid outlet 310 or the second fluid outlet 260 according to the position of the plunger 210 in the chamber 220.

Figure 17:
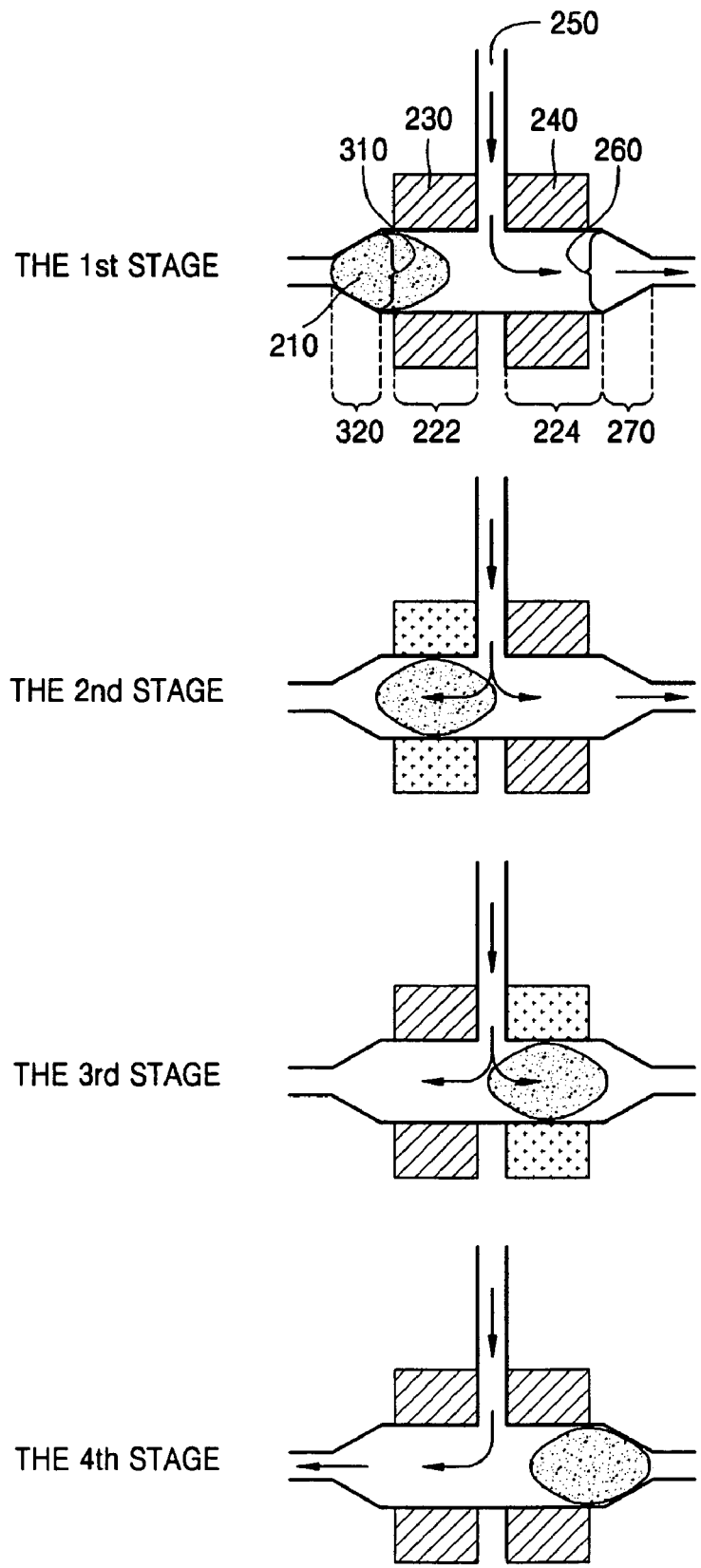
FIGS. 17 through 19 are cross-sectional views illustrating a method of operating a valve from an open stable state of a second fluid outlet to an open stable state of a first fluid outlet in a method of operating a valve according to the second embodiment of the present invention.

FIG. 17 is a cross-sectional view illustrating a sequence of operating a valve from an open stable state of a second fluid outlet 260 to an open stable state of a first fluid outlet 310 of the valve according to the second embodiment of the present invention.

Referring to FIG. 17, an operation includes: a first stage—the plunger 210 is positioned in the first region 222 and no current is applied to the first electromagnet 230 and the second electromagnet 240; a second stage—a current is applied to the first electromagnet 230 but not to the second electromagnet 240; a third stage—a current is applied to the second electromagnet 240 but not to the first electromagnet 230; a fourth stage—no current is applied to the first and second electromagnets 230 and 240.

In the first stage, the plunger 210 is positioned in the first valve seat 320 of the first region 222 by the fluid pressure, and a fluid entering through the fluid inlet 250 flows to the second fluid outlet 260 after passing through the second region 224 of the chamber 220. At this time, the second fluid outlet 260 of the valve is in an open stable state. In the second stage, the plunger 210 in the first region 222 is moved to the first region 222 close to the second electromagnet 240 by the magnetic field formed by the first electromagnet 230. In the third stage, the plunger 210 is moved to the second region 224 close to the second electromagnet 240 by the magnetic field formed by the second electromagnet 240. In the fourth stage, the plunger 210 is moved to the second valve seat 270 by the pressure and inertia of the fluid flowing in the chamber 220. The fluid pressure maintains contact between the plunger 210 and the second valve seat 270. The contact between the plunger 210 and the second valve seat seals the valve. At this time, the fluid passes through the first fluid outlet 310 and the valve maintains an open stable state of the first fluid outlet 310.

Figure 18:
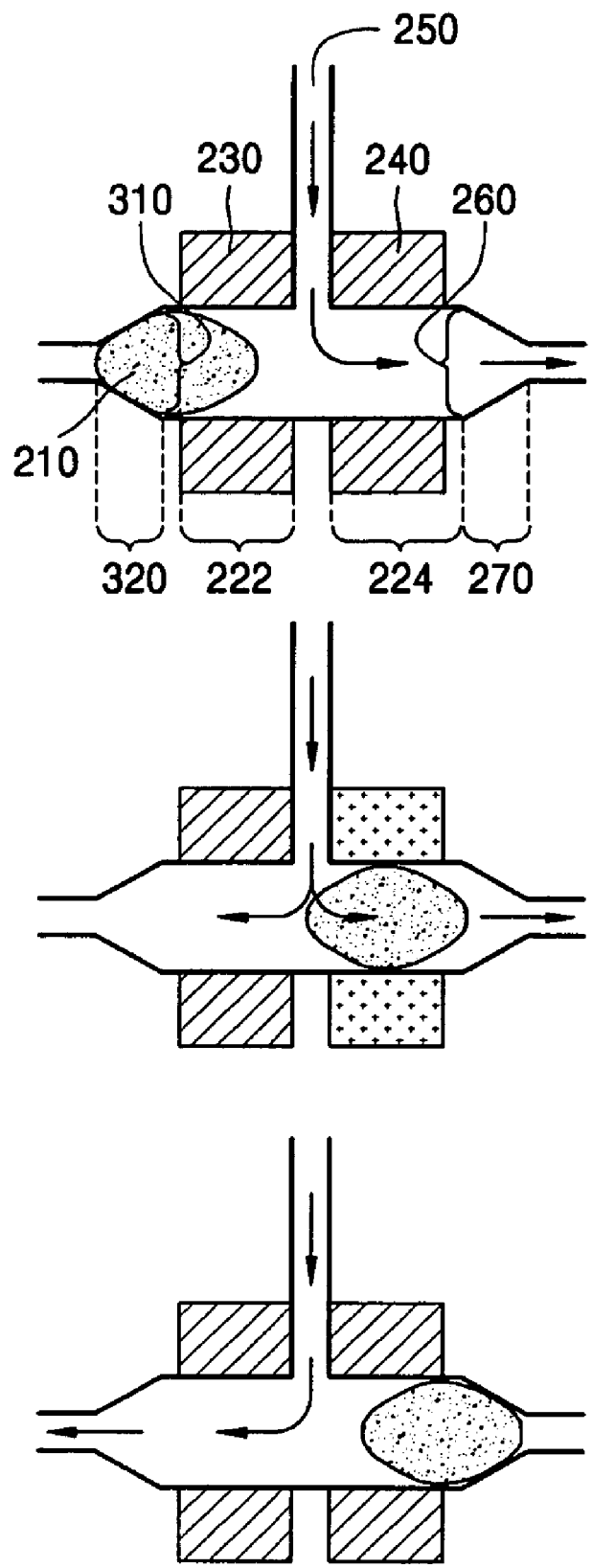
Figure 19:
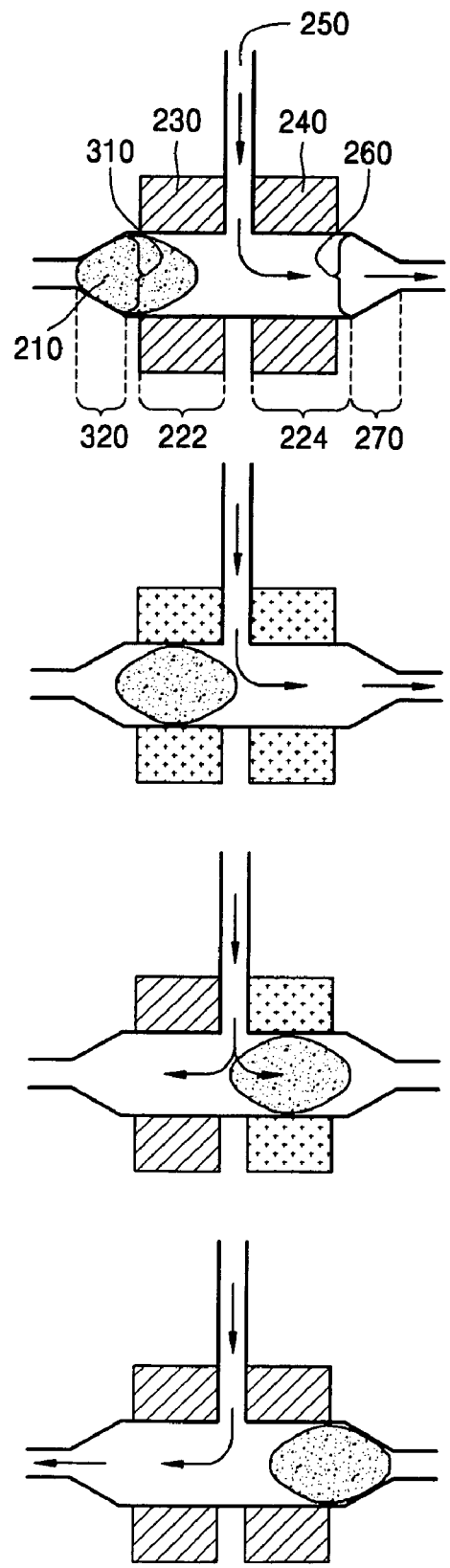

FIGS. 18 and 19 are cross-sectional views illustrating another operating sequence of valves from an open stable state of a second fluid outlet 260 to an open stable state of a first fluid outlet 310 of a valve according to another embodiment of the present invention. Referring to FIG. 18, the second stage may be omitted if the plunger 210 can be moved only by the second electromagnet 240. Referring to FIG. 19, the second stage can include an operation for applying a current to the second electromagnet 240 together with the first electromagnet 230 to move the plunger 210.

Of the operation method of the valve according to another embodiment of the present invention, the operation from an open stable state of the first fluid outlet 310 to an open stable state of the second fluid outlet 260 is substantially the same as the method depicted in FIGS. 17 through 19, due to the symmetry of the present embodiment, and thus the descriptions will not be repeated.

A valve according to the present invention does not need an energy supply from an external power source when open or closed, unlike a conventional ball valve that uses an electromagnet. The valve according to the present invention only consumes energy in a transitional stage. A first valve seat 320 and a second valve seat 270 respectively located in a first region 222 and a second region 224 increase the contact area with the plunger 210. Electromagnets around the first valve seat 320 and the second valve seat 270 reduce leakage of fluid when the fluid pressure is low, by applying a force attracting the plunger 210 to the valve seat.

Also, a valve according to the present invention can be used for a bi-directional flow, since the valve is symmetrical, and its simplicity allows it to be readily connected to other fluid systems. Therefore, the valve according to the present invention can be used as a multi-purpose valve and a control valve, especially for a biochemical microfluidic system where the valve is manufactured in a micrometer scale.

As described above, a valve according to the present invention maintains a stable state when open or close, due to the internal fluid pressure. Energy is consumed only when the valve is in a transitional state. Accordingly, energy consumption is very low.

Also, leakage of the valve is reduced by a valve seat, a magnet around the valve seat, and an elastic coating film on the plunger.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A valve comprising:
    a plunger;
    a chamber having a first region and a second region through which the plunger moves back and forth;
    a first electromagnet and a second electromagnet which are located around the first region and the second region, respectively, and apply a magnetic field to the plunger;
    a fluid inlet through which a fluid enters into the chamber, the fluid inlet located between the first region and the second region of the chamber;
    a second fluid outlet located on a vertical end part of the second region of the chamber away from the first region of the chamber; and
    a pressure balancing channel in fluid communication with the first region of the chamber and the fluid inlet to aid in the movement of the plunger.

2. The valve of claim 1 further comprising a second valve seat, which the plunger contacts, on the second fluid outlet.

3. The valve of claim 1 further comprising a second magnet unit that applies a force attracting the plunger to the second valve seat, around the second valve seat.

4. The valve of claim 1, wherein the second valve seat is formed of a polymer.

5. The valve of claim 1, wherein the pressure balancing channel is connected to a side surface of an inlet channel connected to the fluid inlet and to a vertical end part of the first region of the chamber.

6. The valve of claim 1 further comprising a first fluid outlet on a vertical end part of the first region away from the second region, to selectively control the flow of the fluid.

7. The valve of claim 6 further comprising a first valve seat, which the plunger contacts, on the first fluid outlet.

8. The valve of claim 7 further comprising a first magnet unit that applies a force attracting the plunger to the second valve seat, around the first valve seat.

9. The valve of claim 1, wherein the first valve seat is formed of a polymer.

10. The valve of claim 1 further comprising an elastic coating film on the plunger to seal the valve.

11. The valve of claim 1, wherein the plunger is formed of a ferromagnetic material.

12. A valve comprising:
    a plunger;
    a chamber having a first region and a second region through which the plunger moves back and forth;
    a first electromagnet and a second electromagnet which are located around the first region and the second region, respectively, and apply a magnetic field to the plunger;
    a fluid inlet through which a fluid enters into the chamber, the fluid inlet located between the first region and the second region of the chamber;
    a first fluid outlet located at the first region of the chamber; and
    a second fluid outlet located at the second region of the chamber,
    wherein the first region of the chamber is defined between an edge of the first electromagnet adjacent to the fluid inlet and the first fluid outlet, and the second region of the chamber is defined between an edge of the second electromagnet adjacent to the fluid inlet and the second fluid outlet; and a pressure balancing channel in fluid communication with the first region of the chamber and the fluid inlet to aid in the movement of the plunger.

13. The valve of claim 12, wherein an entirety of the plunger moves between first region of the chamber and the second region of the chamber.

* * * * *